Oct. 3, 1961  R. W. ASTHEIMER  3,003,064
INFRARED DIMENSIONAL GAGE
Filed Feb. 19, 1960  2 Sheets-Sheet 1

*INVENTOR.*
ROBERT W. ASTHEIMER
BY
*ATTORNEY*

Oct. 3, 1961    R. W. ASTHEIMER    3,003,064
INFRARED DIMENSIONAL GAGE

Filed Feb. 19, 1960    2 Sheets-Sheet 2

*INVENTOR.*
ROBERT W. ASTHEIMER
BY
*Robert Ames Norton*
ATTORNEY

United States Patent Office 3,003,064
Patented Oct. 3, 1961

3,003,064
INFRARED DIMENSIONAL GAGE
Robert W. Astheimer, Westport, Conn., assignor to Barnes Engineering Company, Stamford, Conn., a corporation of Delaware
Filed Feb. 19, 1960, Ser. No. 9,787
4 Claims. (Cl. 250—83.3)

This invention relates to an infrared dimensional gage which can measure dimensions continuously from a distance.

The measurement of dimensions presents a serious problem when the nature of the material does not permit direct contact. Examples of such problems are those presented in the measurement of dimensions of hot metals, glass, etc., for example, the edge of a strip of steel being rolled, the drawing of hot wires or tubes and the like. The gage of the present invention is equally useful for measuring the width of a hot object or to measure the position of an edge of a hot object as in the case of a wide strip of steel where only the location of the edge is of interest. The present invention solves the problem by using the infrared radiation of the material itself. Depending on the infrared detector used the material can be measured either when it is quite hot or when it is relatively cool or warm so long as it presents a large heat differential as compared to its surroundings. Essentially the present invention involves a suitable infrared detector and optics for imaging the material, the dimensions of which are to be measured, onto the detector and a combination of reticle and mask. The mask is provided with a slot, straight or curved, and openings or transparent portions of the reticle so dimensioned that they expose a relatively small portion of the mask slot as the reticle moves. As a result there is presented to the detector either the material to be gaged or its background when the small opening reaches the line of thermal discontinuity. At the edge of the material to be gaged there is a sharp difference in signal and with suitable circuits the length of travel of the opening across the image of the material to be gaged can be integrated giving an output signal which is proportional to the width of the material exposed through the slot.

The gage of the present invention operates remotely from the material to be gaged and is well suited to gage materials which by reason of their temperature or other environmental conditions cannot be contacted by the ordinary type of gage. Reference has been made above to the difference in infrared radiation, that is to say, difference in temperature of the material to be gaged and the blackground in terms of a material which is hotter than the background. Of course, it is possible to make measurements if the material to be gaged is much colder than the background so long as the temperature differential is sufficient so that a reliable signal is produced.

Since the device of the present invention is a dimension gage it becomes necessary to eliminate variations due to temperature variations in the material being gaged. This is best effected electronically by suitable circuits which clip the signal to a predetermined voltage for temperatures below the lowest temperatures to be encountered with a particular hot material or above the highest temperatures in the case of a material which is colder than its environment then the instrument output is determined solely by the dimensions of the material regardless of changes of temperature in the material as it is measured or moves past the measuring instrument. For this reason a definite type of electronic circuit in combination with the reticle mask and infrared detector is involved. However, the particular design of electronic circuits of the necessary type forms no part of the present invention and so in the description to follow the electronic circuits will be treated semi-diagrammatically.

Depending on the nature of the reticle the opening in the mask may be a horizontal slot, straight or curved, or it may be a radial slot. Typical reticle designs of these types will be illustrated in the drawings but, of course, the invention is not limited to the details thereof and any combination of reticle and mask which causes successive small portions of the material to be gaged to be imaged on the infrared detector may be used.

The invention will be described in greater detail in conjunction with the drawings in which.

Figure 1:
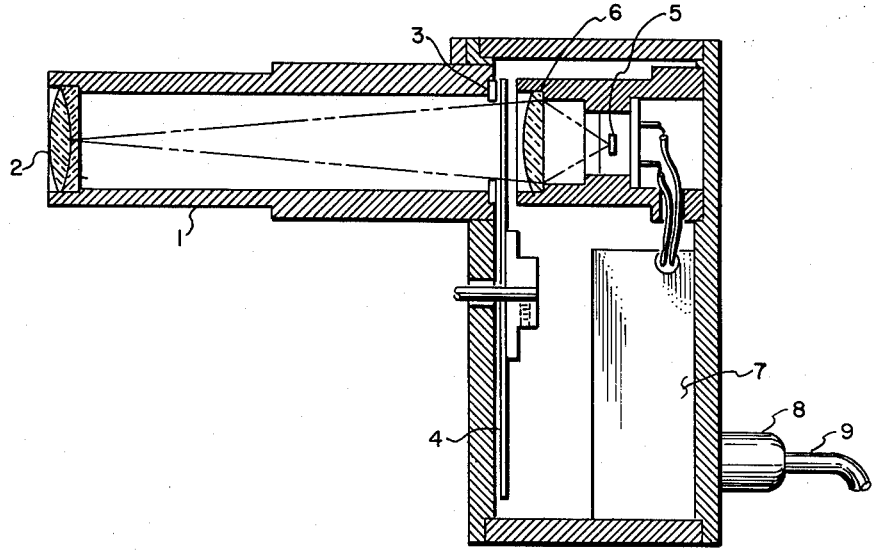
FIG. 1 is a vertical cross section through the center of the instrument.

The instrument shown in FIG. 1 comprises an L shaped housing 1 carrying an infrared objective 2, a slotted mask 3, a rotating reticle or scanning disc 4, an infrared detector 5 and a field lens 6. The output of the detector is fed into an electronic compartment 7, shown as a block, the schematic of which appears in FIG. 4 and finally the output of the electronic circuits is carried to a suitable meter, recorder or relay system which because it is conventional, is not shown. The connection is by a plug 8 and cable 9.

Figure 2:
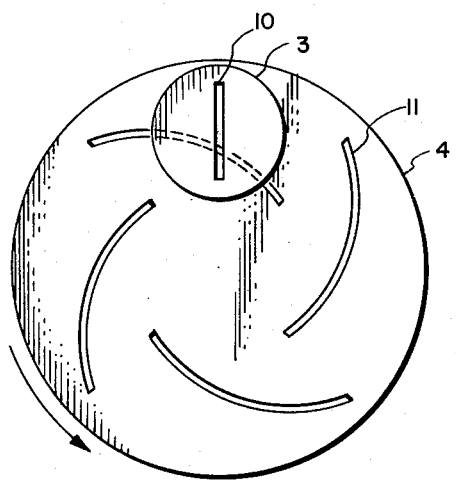
FIG. 2 is a plan view of mask and reticle having a radial slot in the mask.

FIG. 2 shows a slot 10 in the mask 3 and a series of spiral openings or transparent segments 11 in the scanning disc 4. The disc is rotated at uniform speed by drive means (not shown). As the reticle or scanning disc 4 rotates in the direction shown by the arrow in FIG. 2 the spiral openings or clear segments appear to move along the slot 1 in the mask exposing a small, substantially square opening beginning at the top of the slot and moving down to the bottom. At this point the next spiral segment takes over and the opening moves again from the top down. The field lens 6 images any portion of the slot 10 on the detector.

Figure 3:
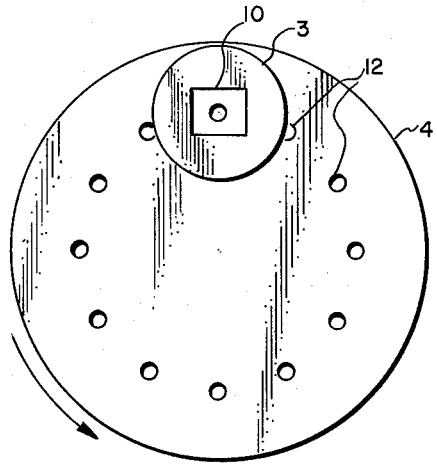
FIG. 3 is a plan view of half a reticle and mask with a horizontal slot and circular reticle openings.

FIG. 3 shows a simpler design which for many purposes is preferable. Here the slot 10 in the mask is horizontal and the reticle is provided with small circular openings 12 uniformly spaced, the openings being considerably smaller than the width of the slot 10. The spacing of the transparent openings 12 with respect to the length of the slot will be discussed below.

Figure 4:
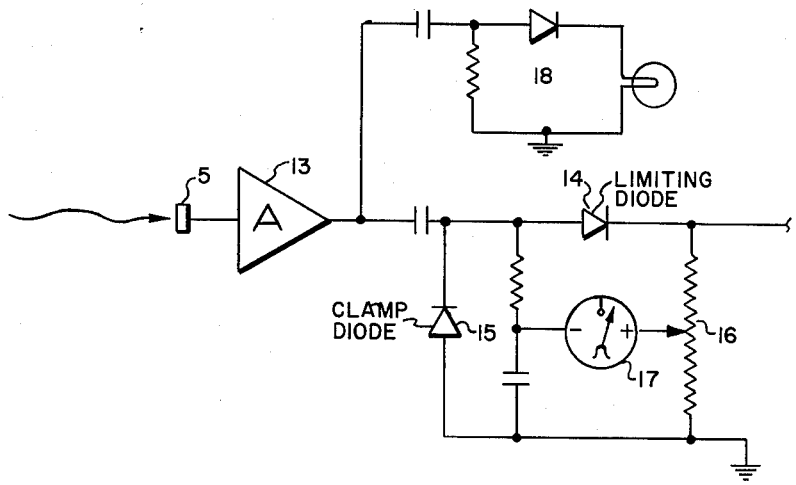
FIG. 4 is a schematic diagram of a typical electronic circuit.

FIG. 4 shows a typical electronic circuit. The output of the detector is amplified in an amplifier 13, the output of which passes onto a circuit provided with a limiting diode 14 and a clamping diode 15. The limiting diode prevents the voltage from exceeding a predetermined maximum which is below the minimum voltage produced by the radiation of the material to be gaged if warmer and maximum if colder than its background.

The clamping diode clamps the background voltage to ground and provides for a minimum voltage level. The limiting voltage passes through a voltage divider 16 which is adjustable and a meter 17 reads the integrated signal.

Figure 5:
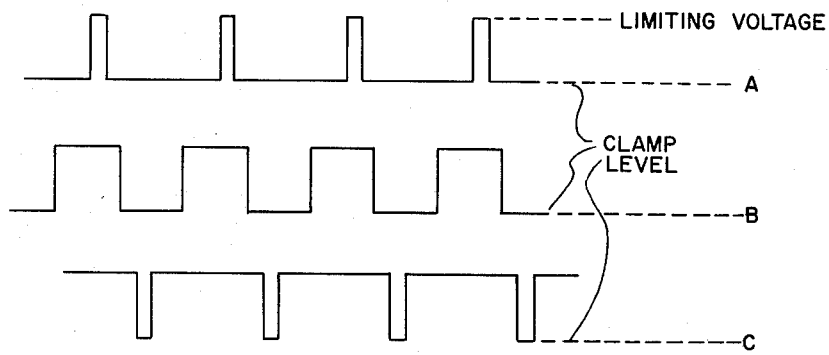
FIG. 5 is a representation of output signals for different dimensions of material to be gaged.

FIG. 5 shows the form of the output signal from the detector for three widths of material, (A) for a narrow width, (B) for one which is half the dimensions of the slot and (C) for a wide material. A series of rectangular pulses are produced, labelled A, B and C in FIG. 5. It will be noted that the width of the pulses is proportional to the width of material being gaged whereas the voltage is invariant because of the clipping by the limiting diode 14. As the meter 17 and its associated circuit will not respond to rapid pulses it integrates the pulses and gives a reading which is proportional to pulse width. The meter can be calibrated by adjustment of the voltage divider circuit 16 so that it will read zero for a predetermined dimension.

FIGS. 2 and 5 are shown as operating for the gaging of one edge of material moving past, for example, a piece of hot steel strip. By suitable adjustment of the meter the dimensions of a narrow ribbon or wire can be gaged. Here the meter does not register until the first edge of the relatively thin material to be gaged is imaged on the detector and integrates the pulses over the total width.

The mask and reticle design shown in FIG. 2 is accurate and reliable. It is, however, somewhat expensive to produce. The spiral segments 11 require careful construction. For most purposes a much simpler reticle design is shown in FIG. 3. The operation is, of course, the same as in FIG. 2, that is to say, a small opening passes along the slot and the response of the electronic circuits can be as described above. When it is desired to measure one edge of a wide piece of material such as steel strip greater information can be obtained if the spacing of the openings 12 is greater than the length of the slot 10. In such a case the meter will read zero if the edge has not yet reached the slot and will give a full scale reading if the edge has moved all the way across the slot. If the spacing of the openings were less than the slot width or equal to it when the material to be gaged has moved fully across the slot, there would always be a signal from the infrared detector and as this would be a continuous D.C. signal it would not be amplified and so the meter reading would be zero. In other words it could not be determined from the reading of the meter whether the edge had not yet reached the slot or had gone beyond it.

For the gaging of material which is narrower than the long dimension of the slot the spacing of openings on the reticle is immaterial. The same reading will be obtained if the openings are spaced more closely than if they are spaced a distance greater than the slot length. The only difference would be the frequency of the rectangular pulses. However, as the use of a spacing greater than the long dimension of the slot is just as good for gaging narrow material and at the same time permits an accurate gaging of one edge only of a wide piece of material this modification is preferred.

The considerations of opening spacing on the reticle apply also to the design shown in FIG. 2, that is to say, there is an odvantage in having the spiral openings spaced so that one opening leaves the radial slot before the next opening starts coming into it.

It is not necessary that the slot 10 be exactly rectangular. All that is necessary is that the edges at the two ends be accurate throughout the extent which is opened by the openings. The slot may be curved in accordance with the arc of the particular zone of the reticle where it is located and theoretically this would permit operation with openings of maximum size for a minimum width of slot. Such curved slots are entirely suitable but they are not necessary for practical operation because if the openings are considerably smaller than the width of a slot an ordinary straight rectangular slot will give just as accurate results and is, of course, cheaper to produce.

In FIG. 4 an ordinary D.C. meter has been shown for illustrative purposes. Once the rectangular pulses of fixed voltage are produced they can be led to any suitable instrument such as a recorder, relay operated servo mechanisms which can readjust the width of the material being gaged in order to keep it constant and the like.

For some purposes it is desirable to have an indication that the object being gaged is imaged within the slot. In FIG. 4 such an indicator is shown at 18 in the form of a simple diode and lamp.

The sensitivity of the gage depends on the sensitivity of the meter and this can be adjusted in accordance with the dimensions of the material to be gaged. For example, if the material is a wire or a narrow strip or tube the meter can be adjusted to read zero. When the material is of a predetermined desired width and gives positive and negative readings if the width exceeds or falls short of the predetermined figure, in such a case a much more sensitive meter can be used than would be practical if the range of the meter had to accommodate widely varying dimensions. Meters of varying sensitivity can be provided with the sensitivity adjustable for the particular conditions of the gaging.

I claim:

1. A radiation dimensional gage comprising in combination and in optical alignment a mask provided with a window, means for imaging radiations from a radiation emitting object to be gaged onto the plane of the mask, a single radiation detector, means for imaging onto the detector the entrance pupil of the optical system which images radiation from the object onto the window, a movable reticle adjacent the mask and window, said reticle being provided with radiation transparent openings registering with the window to cause a small transparent area to move lengthwise of the window as the reticle moves, said transparent openings having a spacing greater than the dimension of the image of the object to be gaged in the window plane, electronic means connecting the output of the radiation detector to produce therefrom a series of rectangular pulses of fixed voltage and width proportional to the time of irradiation through the reticle opening and electronic means for producing an output signal from the rectangular pulses which is proportional to the dimension of the object to be gaged.

2. A dimensional gage according to claim 1 in which the reticle is provided with a series of small, substantially equally spaced openings.

3. An instrument according to claim 2 in which the spacing of the openings in the reticle is also greater than the lengthwise dimension of the window whereby the detector receives radiation from a single opening at any one time and the detector is an infrared detector.

4. An instrument according to claim 1 in which the spacing of the openings in the reticle is also greater than the lengthwise dimension of the window whereby the detector receives radiation from a single opening at any one time and the detector is an infrared detector.

References Cited in the file of this patent

UNITED STATES PATENTS

| | | |
|---|---|---|
| 2,521,946 | Rathje | Sept. 12, 1950 |
| 2,838,678 | Beese | June 10, 1958 |
| 2,895,049 | Astheimer | July 14, 1959 |
| 2,909,924 | Flook | Oct. 27, 1959 |
| 2,916,632 | Petterson | Dec. 8, 1959 |
| 2,931,917 | Beelitz | Apr. 5, 1960 |